United States Patent [19]

Höffken et al.

[11] 4,208,039
[45] Jun. 17, 1980

[54] DEVICE FOR DIVIDING A STRAND INTO SLABS

[75] Inventors: Erich Höffken, Dinslaken; Werner Kleine-Kleffmann; Rolf Bertram, both of Duisburg; Karl-Heinz Abele, Dinslaken; Günter Michalski, Kamp-Lintfort, all of Fed. Rep. of Germany

[73] Assignee: Thyssen Aktiengesellschaft Vormals August Thyssen-Hütte, Duisberg, Fed. Rep. of Germany

[21] Appl. No.: 884,788

[22] Filed: Mar. 9, 1978

[30] Foreign Application Priority Data

Mar. 11, 1977 [DE] Fed. Rep. of Germany ....... 2710564
Mar. 11, 1977 [DE] Fed. Rep. of Germany ....... 2710574

[51] Int. Cl.$^2$ ........................................... B22D 11/126
[52] U.S. Cl. ........................................ 266/50; 266/69; 266/142
[58] Field of Search ................ 148/9 R; 266/50, 69, 266/142, 902; 164/263

[56] References Cited

U.S. PATENT DOCUMENTS

| 3,281,903 | 11/1966 | Ross | 164/263 |
| 3,497,195 | 2/1970 | Kalkhof | 164/263 |
| 3,539,168 | 11/1970 | Pfeuffer | 266/50 |
| 4,001,051 | 1/1977 | John | 164/263 |

FOREIGN PATENT DOCUMENTS

4916002 9/1970 Japan ........................................ 266/142

Primary Examiner—John McQuade
Attorney, Agent, or Firm—Sprung, Felfe, Horn, Lynch & Kramer

[57] ABSTRACT

A device for longitudinal cutting cast strands is disclosed. Disclosed is a means for transversely severing a strand into slabs, feeding the slabs selectively to a plurality of longitudinal cutting means and longitudinally cutting said slabs therein. Also disclosed is a novel longitudinal cutting means comprising a flame cutter and a cutting point opening in registry therewith.

9 Claims, 4 Drawing Figures

DEVICE FOR DIVIDING A STRAND INTO SLABS

This invention relates to a device for dividing a strand into slabs with a device for dividing said strand transversely arranged after the strand guiding roller apron and with a device for dividing said strand longitudinally, and to a method of operating said device.

The invention relates particularly to the division of a steel strand into slabs.

In conjunction with steel continuous casting plants it is proposed in the Japanese Published Patent Application 50-128 628 to divide the strand longitudinally by flame cutting directly subsequent to the roller apron and then to divide the strand transversely. In the case of this proposal the strand is divided longitudinally when hot and then divided transversely. This construction does not guarantee an exact longitudinal division with desired division proportion for various reasons. One is that it is problematic to alter the division proportion during continuous casting when the strand is being continuously extracted. Moreover, exact straightening of the strand longitudinally is not guaranteed as the continously extracted strand does not always assume exactly the same position. The specialists have therefore preferred to divide excessively wide slabs longitudinally when cold. A corresponding proposal is known from the publication "Concast News" 13 (1974, pages 6 and 7). The advantages of longitudinal division of cold slabs are regarded as being that less slag and fumes are produced on division and that the cycle time of longitudinal division is independent of the casting speed. The disadvantage of these known plants is that they need a substantial amount of space and often additionally need an intensive cooling plant in order to cool the slabs, which have been cut into lengths, quickly down to room temprature.

The object of the present invention is to develop a device for dividing a strand into slabs which guarantees a quick and exact longitudinal division even with high casting speeds at the same time being low in apparatus cost and having a simple construction. It is a further object of the present invention to develop a novel cutting device suitable for a longitudinal cutting of slabs.

This object is solved according to the invention in that the transverse dividing device has at least two longitudinal dividing devices arranged thereafter, to which the cut off slab can be guided selectively by means of at least one transport means. A common transport means is preferably provided for all the longitudinal dividing device. A favourable arrangement as to space is hereby achieved if the common transport means is in the form of a transverse transporting device. It is expedient to arrange the longitudinal dividing devices in the proximity of or at height of the run-out roller table allocated to the strand. In a particularly advantageous embodiment the longitudinal dividing devices are arranged parallel to the run-out roller table. The aforementioned constructions have the advantage that even at high casting speeds the longitudinal division can be carried out in a very short time after the transverse division, whereby the slab must merely be conveyed to the respective free longitudinal dividing device by means of the transport device after transverse division. As the transverse dividing device, the run-out roller table, the transport device and the longitudinal dividing devices are arranged very closely together, the entire plant is space-saving and constructionally simple.

A particularly advantageous embodiment is characterised in that the individual longitudinal dividing devices, which are each equipped with at least one flame cutting means, have a cutting point opening allocated to and below the flame cutting means on (in) the slab bearing area and a transverse shifting means on the longitudinal side of the slab bearing surface on at least one of the two longitudinal sides. The slab is laterally straightened with the aid of the transverse shifting means. In order to set the exact division proportion over the width of the slab, the cutting torches can be either transversely shiftable or assembled so as not to be shiftable in transverse direction. Torches which are not shiftable in transverse direction are preferred if, at the same time, the cutting point opening allocated thereto on (in) the slab bearing area is fixed (stationary). In conjunction with this construction it is particularly advantageous if the transverse shifting means is in the form of a centering means which centres and shifts the slabs respective to the (fixed) cutting point opening in transverse direction of the longitudinal dividing device. This centering means arranged on the longitudinal side is, for expedience, composed of at least a transverse shifting means arranged on the longitudinal side and a transversely shiftable abutment along the other longitudinal side of the slab, so that the division proportion can be adjusted exactly to the cutting torches and the (fixed) cutting point opening. For this slab merely needs to be shifted with the aid of the centering means. The transversely shiftable centering means is in abutting relationship with the longitudinal side of the slab, i.e. it is arranged vertical to the broad side of the slab. The centering means can be stopped after the slab has been centred. The longitudinal dividing device has therefore only few parts which are mobile during operation and therefore it is guaranteed that the slabs can be divided longitudinally with the aid of this device in the desired division proportion and very accurately.

A construction which is to be emphasized is one in which the cutting point opening is in the form of a narrow gap which feeds into a channel receiving the waste material. With this construction the waste material can be easily removed. It is particularly advantageous in this construction if a suction device for removing the fumes is attached to the channel. It has been seen that besides the slag produced approx. 90% of the fumes produced arise below the slab and therefore by using the suction device almost all the disturbing fumes can be removed. If the cutting point opening formed as a gap is not particularly large, there is the advantage that only a small proportion of infiltrated air (false air) is also sucked off. It is thereby possible that the problem of waste gas can be effectively dealt with even with relatively low suction performance of the suction device. This aim is realized in an even better way if—part from the necessary cutting point opening—the channel can be closed for the most part in order to minimize the penetration of infiltrated air. Expedient solutions for this are explained in connection with FIGS. 3 and 4.

According to one embodiment the cutting torch and the cutting point opening are fixed in both transverse and longitudinal direction of the device, whereby the slab is pushed over the cutting point opening in longitudinal direction for division longitudinally. The slab is thereby guided longitudinally by the stopped (secured) centering means. In this construction the cutting point opening and the channel situated below it are restricted in longitudinal direction of the device to a narrow space so that the slag produced in this space can be easily removed. It is preferred in this construction that on a single cutting torch is used in order to guarantee a smooth cut edge without any faults.

According to another preferred embodiment the cutting point opening in the form of a gap and the channel connecting therewith extend practically over the entire length of the longitudinal dividing device below the slab bearing area, whereby for expedience two flame cutting devices, which are movable longitudinally in opposing directions, are arranged above the slab bearing area for dividing the slab longitudinally. This construction guarantees that the slab is divided quickly in longitudinal direction, i.e. in almost half the time, whereby at the same time slag and fumes are removed simply. As an alternative to the channel provided over the entire length of the longitudinal dividing device it is also possible to provide a (bucket) tub, for example, which can be moved in the conceived gap direction, i.e. a much shorter slab collecting device, whereby the feed motion of the tub must be coordinated with the feed motion of the cutting torch. The construction with the movable tub can be used advantageously when the slab lies securely on the bearing area during the entire flame cutting process, i.e. the slab does not work too hard during the flame cutting.

The device according to the invention is preferably operated in such a way that the slabs which have been cut in lengths from the strand by transverse division are conveyed to one of the longitudinal dividing devices directly out of the casting heat at surface temperatures of over 300° C. Longitudinal division at surface temperatures of over 500° C. is preferred. It was observed that the formation of sabre-shaped longitudinal sides of the slab can be avoided by maintaining the surface temperature as high as possible during longitudinal division. Conversely, the Applicant has established that at slab temperatures of approx. 150° to 250° C. the slabs tend to distort outwardly in the form of a sabre—working from the flame out line—so that further treatment of the divided sabre-shaped slabs is made more difficult.

In order to guarantee the highest possible surface temperature, it has proved advantageous that the slab cut from the strand is moved on without delay after transverse division and is divided longitudinally practically without temporal delay. This quick longitudinal division is possible due to the allocation according to the invention of transverse dividing device, run-out roller table, transport means combined with several longitudinal dividing devices. The subject of the invention is particularly suited for dividing continuously cast slabs for magnetic sheet materials with a silicon content of greater than 0.6%, preferably greater than 1.5% Si.

The particular advantages of the subject of the invention are to be seen in that very quick longitudinal division is possible at the highest possible slab temperature with a low cost in apparatus. Slabs which are narrower and in particular variable in width can be cut from excessively wide continuously cast slabs. These cut slabs are particularly favourable as starting product for rolling mills and the desired sheet widths. In continuous casting the advantages of sequence casting can be used as quick and exact longitudinal division is possible with the construction according to the invention. The advantageous embodiments of the longitudinal dividing devices specified in the claims additionally guarantee that no problems arise due to slag or fumes as the fumes and working material losses produced can be removed without at a low constructional cost without impairing the environment. The subject of the invention offers the additional advantage that the longitudinally divided slabs are still so hot that the remaining heat in the slab can be utilised for the subsequent reheating up to rolling temperature. The subject of the invention permits the longitudinal division of continuously cast slabs when still hot, i.e. out of the production flow of the continuous casting plant, with a high degree of accuracy.

DESCRIPTION OF PREFERRED EMBODIMENT

The invention is explained below in greater detail by means of an embodiment.

Figure 1:
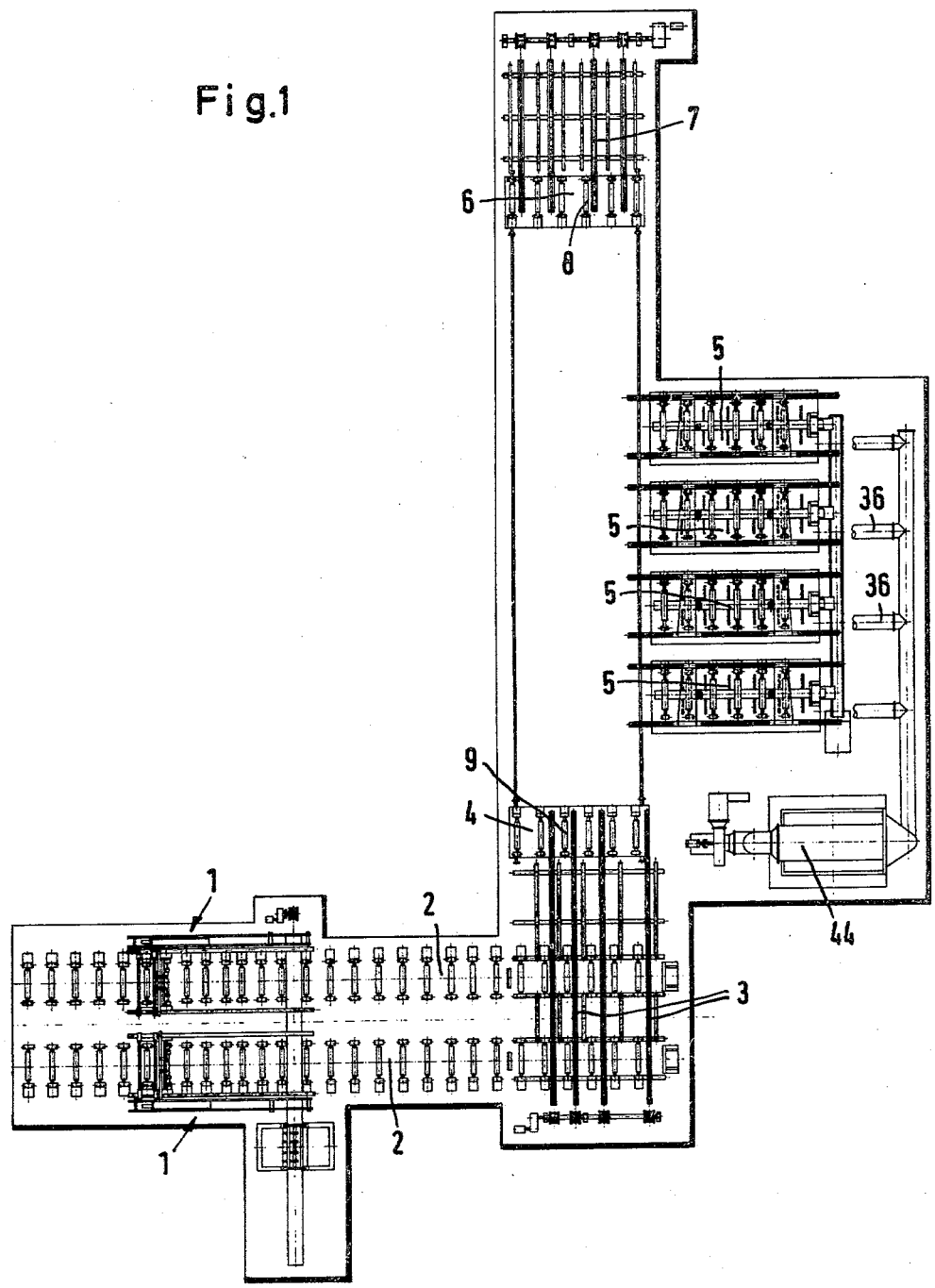
Figure 3:
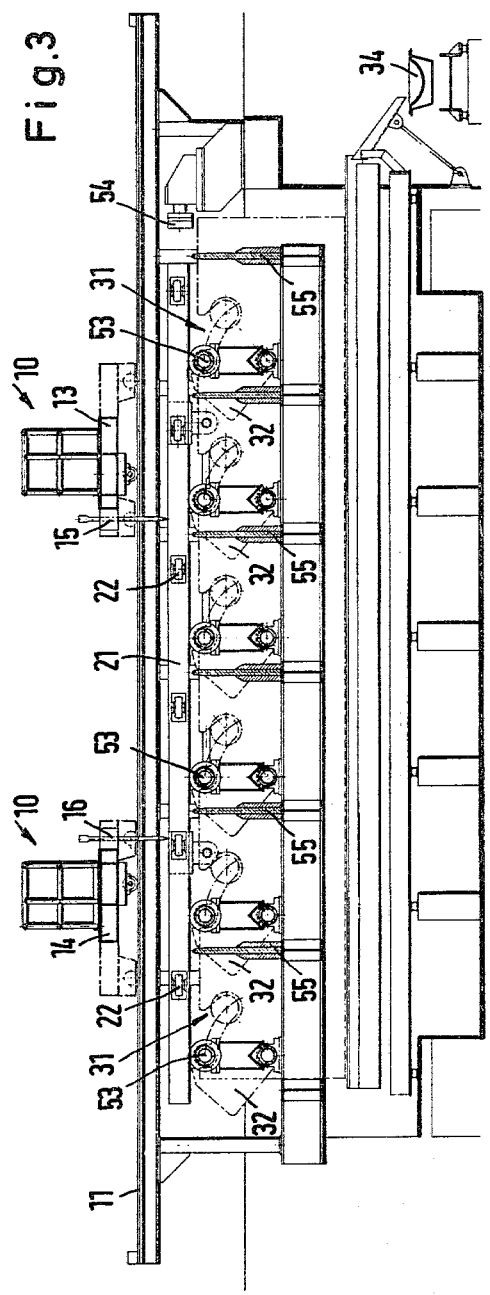
Figure 2:
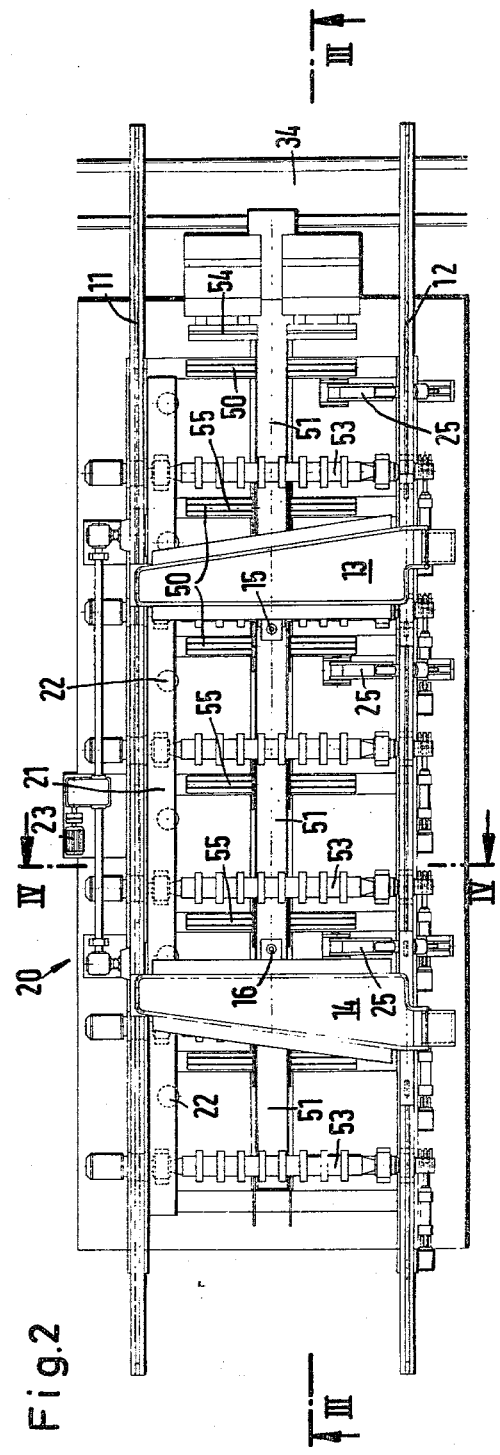
Figure 4:
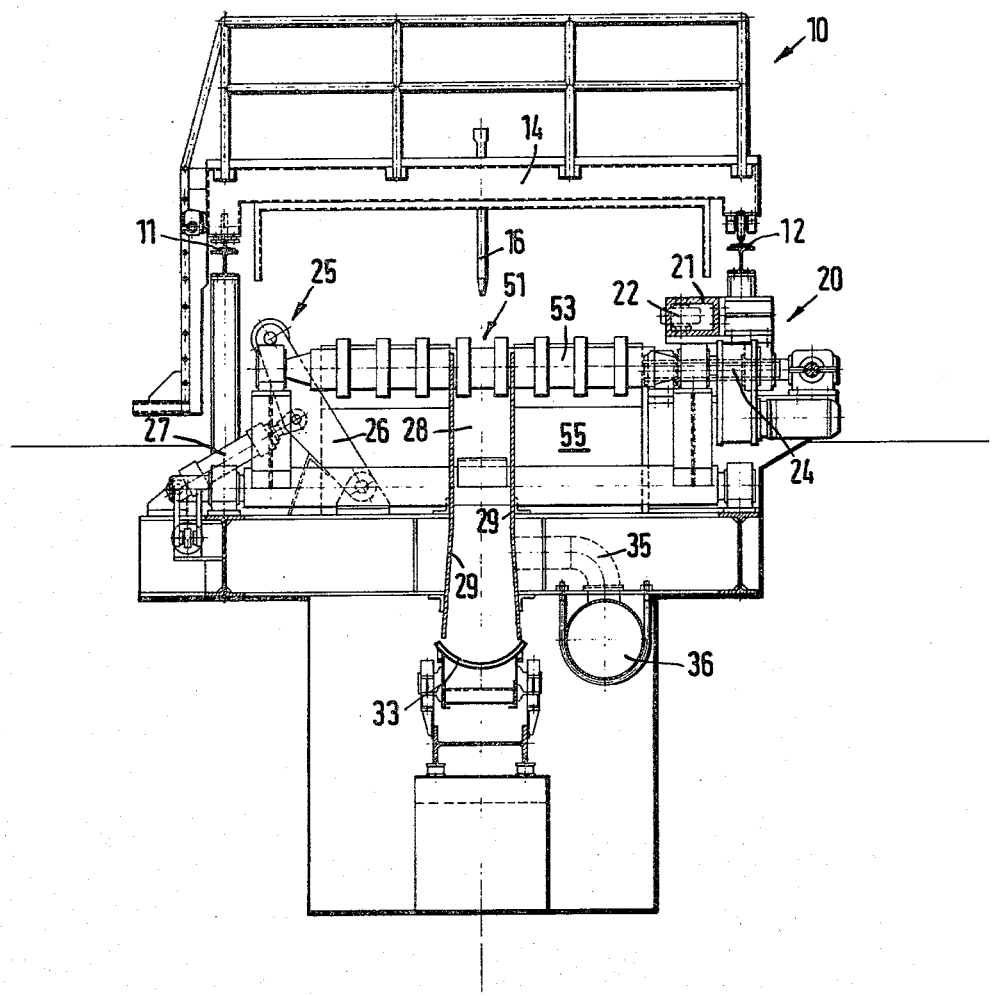

FIG. 1 shows a top view onto an entire plant with several longitudinal dividing devices, FIG. 2 shows a top view of one of the longitudinal dividing devices, FIG. 3 shows a longitudinal section through the longitudinal dividing device according to III—III of FIG. 2 and FIG. 4 shows a cross-section through the longitudinal dividing device according to IV—IV of FIG. 2.

FIG. 1 shows the part of a twin strand slab continuous casting plant arranged after the roller apron strand guiding means (not shown), each with a transverse dividing device 1 and the connecting run-out roller table 2. The run-out roller tables 2 are connected selectively with one of four longitudinal dividing devices 5 by means of a joint transverse transport means 4. The connection between the run-out roller tables and the transverse transport means 4 is provided by the transfer 3. The slabs produced after transverse division can be moved off from the run-out roller tables 2 individually by the transfer 3 and conveyed to the transverse transport means 4. In the shown example a transport car which can be moved on rails is provided as transverse transport means. The four longitudinal dividing devices 5 are parallel and adjacent to one another at about the height of the section of the run-out roller tables 2 which extend behind the transverse dividing devices 1 of the continuous casting plant. This offset construction method of longitudinal dividing devices 5 and run-out roller tables 2 provides a compact arrangement, whereby a quick transporting of the slabs to and possibly also off the longitudinal dividing devices 5 is guaranteed with only one common transverse transport means.

As FIGS. 2 to 4 show, each longitudinal dividing device 5 has a slab bearing surface 50 and at least on flame cutting means 10. The slab bearing area 50 has a gap-like cutting point opening 51 below the flame cutting means 10. The gap-like cutting point opening 51 extends practically over the entire length of the longitudinal dividing device and is arranged, looking at it in transverse direction, approximately in the middle of the longitudinal dividing device. The transversely shiftable centering means 20 is positioned on one longitudinal side of the longitudinal dividing device 5. The pressing device 25 is provided as abutment on the other longitudinal side of the slab.

Individually, FIGS. 2 and 3 show that the longitudinal dividing device 5 preferably has six rollers 53 arranged one behind the other for transporting the slab on and off said longitudinal dividing device 5, whereby the feed motion of the slab is restricted at the front side by a fixed stop 54. The rollers 53, i.e. individually actuated rollers which are cooled inside, are swung away forwards and downwards in a way known per se after the slab has been transported (see dotted position of rollers in FIG. 3). When the rollers 53 have been swung away the slab rests on a plurality of bearing elements 55 which are arranged one behind the other to form the slab bearing area 50. This slab bearing area 50 on the individual bearing elements 55 are divided in the middle in longitudinal direction by the gap-like cutting point opening 51. Thereby the width of the cutting point opening 51 amounts at least to about 100 mm in transverse direction of the longitudinal dividing device 5. According to FIGS. 2 and 3 a total of six bearing elements 55 arranged one behind the other are provided.

The flame cutting means with 10 as reference for the whole is situated above the bearing elements 55. The flame cutting means is composed of two torch cars 13 and 14. Each equiped with cutting torches 15,16. Each torch car 13,14 is individually actuated. During the flame cutting the torch cars are moved towards each other with a feed motion corresponding to the flame cutting speed. The cutting torches 15,16 are positioned in the middle of the car and are assembled so securely on the torch car 13,14 in transverse direction of the longitudinal dividing device 5 that they move towards each other during the flame cutting on a straight line, the so-called flame cutting line. This flame cutting line overlaps the gap-like cutting point opening 51 position underneath it.

In order to set the desired width, into which the slab resting on the slab bearing area 50 is to be divided longitudinally, the centering means 20 is provided on one side of the bearing area 50. The centering means 20 is composed of a ruler-type beam 21 which is armed with rollers 22 and runs parallel to the longitudinal axis of the longitudinal dividing device 5. With the assistance of the worm gear 24 actuated by motor 23 the beam 21 can be pushed transversely to the longitudinal axis of the longitudinal dividing device 5 and then brought to a fixed position. In the shown preferred embodiment pressing devices 25 are provided on the other longitudinal side of the slab bearing area 50. These pressing devices 25 are composed of a rotatable lever 26 which stri-kes the floor of the longitudinal dividing device 5 and which can be operated by a hydraulic cylinder 27. After the desired widths into which the slab is to be divided longitudinally have been set with the assistance of the centering means 20, the slab is pressed by means of the pressing device 25 against the beam 21 which serves as an abutment. Exact centering of the slab is hereby guaranteed.

FIG. 2 shows that the cutting point opening 51 as narrow gap practically extends over the whole of the length of the longitudinal dividing device 5. As the cross-section in FIG. 4 shows, the gap-like cutting point 51 opening feeds into a channel 28 which is only open to the top over the entire length of the longitudinal dividing device 5. The channel 28 has side walls 29 of heat-proof sheets of metal. As FIG. 3 shows, these side walls 29 have recesses 31 which are formed according to the swing path of the rollers 53 (to the right in FIG. 3). When the rollers have been swung to the right, the recesses 31 for the rollers 53 are closed by shutter plates 32. The channel 28 is closed off to the bottom by a jigging conveyor 33 by which the slag produced during flame cutting is conveyed on or in a transport means 34, e.g. on a chute or in a tub.

FIG. 4 shows that conduits 35 feed into the channel 28 at about the middle of the side walls 29, whereby the conduits 35 are attached to a suction conduit 36 which runs parallel to the channel 28. The suction conduit 36 feeds into a dedusting plant 44 (see FIG. 1). The shown construction has the advantage that a good removal of slag by suction is guaranteed with relatively low activity. The shutter plates 32 contribute to this; they close the recesses 31 in the side walls 29 of the channel 38 during the flame cutting. Furthermore, the upper edge of the side walls 29 extends as far as possible, i.e. up to a distance of approx 20 mm, up to the upper edge of the bearing elements 50, so that when the slab lies thereon only a small amount of infiltrated air can be sucked. If a short slab is lying on the slab bearing area 55, the part of the cutting point opening 51 which is not covered by the slab is open at the top. As too much infiltrated air could be sucked in this case, there is the favourable possibility of closing the channel 28 corresponding to the length of the slab segment by segment from one or from both ends, so that only the part underneath the slab is opened.

To further reduce the proportion of penetrating infiltrated air it is preferred to direct the cutting flame towards or onto the suction conduits 35 in coordination with the cutting. Only the suction conduits are open respectively and thereby functioning at what level the flame cutting devices are positioned.

The working method of the device is as follows: The slab which is cut in lengths from the strand by means of a transverse dividing device 1 is transferred from the transfer 3 to the transverse transport device 4. The transverse transport device 4 in the form of a transport car is preferably armed with a roller table 9. The transport car 4 then moves with the slab to one of the four longitudinal dividing devices 5. When the roller table of the transport car 4 is switched on the slab is moved in longitudinal direction onto the roller table 53 of the longitudinal dividing device 5 so that the longitudinal division can begin. After longitudinal division has been completed the divided slabs are preferably collected by a second transport car 6 which is also armed with a roller table 8 and brought to a lifting truck 7 which singles out the divided slab sections.

In the area of each longitudinal dividing device 5 the slab moves starting from the roller table 9 of the transport car 4, over the roller table of the longitudinal dividing device 5 until it rests against the stop 54. The rollers 53 are dropped and the recesses 31 are closed by the shutter plates 32. The slab now rests on the bearing area 50. The rollers 53 can revolve further when dropped in order to prevent the slag caking.

The slab is now brought into cutting position by the centering means 20. For this purpose the slab is shifted transversely by means of the ruler-like beam 21 of the centering means 20 to the middle of the longitudinal dividing device 5 until the distance between the flame cutting line and the beam 21 corresponds to desired dividing width (e.g. two-part slabs with dividing widths 2/5 and 3/5 of the excessively wide slab). The beam 21 is then secured in this position. The slab is then pressed by means of the pressing device 25 against the beam 21 which serves as an abutment. After this straightening process the beam 21 and the pressing device 25 can be moved back to their starting positions.

For the actual flame cutting process the torch cars 13,14 move towards each other with a predetermined feed motion. They meet at approximately the middle of the torch stretch. Before they reach the middle one of the torch cars 13 or 14 stops it course and moves back to the starting point whilst the other torch car completes the cutting. The slag produced falls freely into the channel 28 beneath the slab bearing surface 50 and is transported to the tub 34 by the jigging conveyor 33. The fumes are sucked through the suction conduits 35, 36 up to the dedusting plant 44. It has been shown that about 90% of the fum-es produced can be removed in this way. The fumes produced above the slab can be caught with the aid of a hood (not shown) and also conveyed to the dedusting plant by means of a conduit.

We claim:

1. A device for cutting a continuously cast strand into slabs and said slabs into individual lengths of a desired width comprising a cut-off unit with a run-out roller table provided for said slabs as utilized in continuous casting plants for cutting said continuously cast strand into successive slabs, at least one transport means for moving said slabs transversely and selectively to different longitudinal cutting means which run parallel to the run-out roller table of said cut-off unit, and at least two longitudinal cutting means, each of said longitudinal cutting means comprising at least one flame cutting means for cutting said slabs longitudinally into said individual lengths of a desired width, a support area for bearing said slabs while being cut longitudinally and which is disposed below said flame cutting means, a cutting point opening in said support area in registry with said flame cutting means, and means for transversely shifting said slabs in respect of said cutting point opening and said flame cutting means, said transversely shifting means being disposed on at least one longitudinal side of said support area.

2. A device according to claim 1 wherein said longitudinal cutting means are positioned proximate to said run-out roller table provided for said cut-off unit, which run-out table is utilized after and belongs to said cut-off unit.

3. A device according to claim 1 wherein said transversely shifting means is in the form of a centering means which centers transversely said slab in respect of said cutting point opening.

4. A device according to claim 1 wherein said cutting point opening is in the form of a gap which is in fluid communication with a channel whereby to receive waste material produced from the longitudinal cutting.

5. A device according to claim 1 wherein said cutting point opening runs practically over the entire length of said longitudinal cutting means and there is disposed on the opposed side thereof a pair of flame cutting means which are movable longitudinally in opposing direction, said flame cutting means being disposed above the cutting point opening.

6. A longitudinal cutting device suitable for a longitudinal cutting of slabs comprising at least one flame cutting means for cutting said slabs longitudinally, a support area for bearing said slabs while being cut longitudinally and which is disposed below said flame cutting means, a cutting point opening in said support area in registry with said flame cutting means and means for transversely shifting said slabs in respect of said cutting point opening and said flame cutting means to set the widths into which the slabs are to be cut, said transversely shifting means being disposed on at least one longitudinal side of said support area.

7. A device according to claim 6 wherein said transverse shifting means is in the form of a centering means which centers transversely said slab in respect to said cutting point opening.

8. A device according to claim 6 wherein said cutting point opening is in the form of a gap which is in fluid communication with a channel whereby to receive waste material produced from the longitudinal cutting.

9. A device according to claim 6 wherein said cutting point opening runs practically over the entire support area and there is disposed on the opposed side thereof a pair of flame cutting means which are movable longitudinally in opposing directions, said flame cutting means being disposed above the cutting point opening.

* * * * *

UNITED STATES PATENT AND TRADEMARK OFFICE
CERTIFICATE OF CORRECTION

PATENT NO. : 4,208,039
DATED : June 17, 1980
INVENTOR(S) : Erich Höffken, Werner Kleine-Kleffmann, Rolf Bertram, Karl-Heinz Abele, and Gunter Michalski It is certified that error appears in the above-identified patent and that said Letters Patent are hereby corrected as shown below:

| Column | Line | |
|--------|------|---|
| 1 | 51 | "device" should be --devices-- |
| 6 | 6 | "38" should be --28-- |

Signed and Sealed this

Twenty-third Day of September 1980

[SEAL]

Attest:

SIDNEY A. DIAMOND

Attesting Officer

Commissioner of Patents and Trademarks